United States Patent [19]

Joyce

[11] Patent Number: 4,686,329

[45] Date of Patent: Aug. 11, 1987

[54] ABSOLUTE POSITION MOUSE

[75] Inventor: Stephen A. Joyce, Chicago, Ill.

[73] Assignee: Advanced Robotic Technology, Inc., Chicago, Ill.

[21] Appl. No.: 747,342

[22] Filed: Jun. 21, 1985

[51] Int. Cl.$^4$ ............................................. G08C 21/00
[52] U.S. Cl. .................................... 178/18; 340/710; 250/237 R
[58] Field of Search ............................ 178/18, 19, 20; 340/710, 707; 250/237 R, 271

[56] References Cited

U.S. PATENT DOCUMENTS

| | | | |
|---|---|---|---|
| 3,668,685 | 6/1972 | Horvath | 340/324 A |
| 3,732,557 | 5/1973 | Evans et al. | 340/324 R |
| 3,852,721 | 12/1974 | Tucker et al. | 340/172.5 |
| 4,022,969 | 5/1977 | McKinlay et al. | 178/18 |
| 4,354,102 | 10/1982 | Burns et al. | 250/201 |
| 4,364,035 | 12/1982 | Kirsch | 340/710 |
| 4,390,873 | 6/1983 | Kirsch | 340/710 |
| 4,409,479 | 10/1983 | Sprague et al. | 250/237 G |
| 4,411,016 | 10/1983 | Wakeland | 382/62 |
| 4,543,571 | 9/1985 | Bilbrey et al. | 340/710 |
| 4,564,835 | 1/1986 | Dhawan | 178/18 X |

Primary Examiner—Stafford D. Schreyer
Attorney, Agent, or Firm—Jones, Day, Reavis & Pogue

[57] ABSTRACT

Apparatus for determining the absolute position of a point on a surface including a tablet or overlay and a moveable mouse-type cursor. The tablet includes a unique pattern of lines or regions along rectilinear or other axes. A series of adjacent spaces formed by the lines define unique cells on the tablet. The mouse includes a pair of linear imaging arrays adapted to detect the presence of tablet lines adjacent thereto. An integrated processor identifies the line types, computes line spacings and ratios, and identifies subtending cells by comparison to the known tablet topography. The processor further computes the precise location of a point defined on the mouse.

10 Claims, 4 Drawing Figures

ABSOLUTE POSITION MOUSE

The present invention relates to a laterally positionable controller for locating a cursor, for example, on a CRT screen or for otherwise determining the orientation of the controller, itself, in relation to a surface. Such a controller is commonly referred to as a "mouse" and, in the computer video graphics environment, functions as a "man/machine" interface to translate lateral movements of the "mouse" controller into corresponding movements of a cursor or pointer on the video display screen.

The mouse is a powerful computer input tool allowing the user to move objects about on the display screen more or less as if they were physical objects on a table top or sheet of paper. It is now possible, for example, to draw, type, edit and compose the figures and text of a document entirely on the graphics display, printing out the paper copy only as a final step, when required.

Mouse-type controllers fall into two broad catagories—absolute position determining and relative motion determining. Relative motion determining is the least expensive and, therefore, most common. Such controllers generally sense the relative travel of the mouse over a surface by resolving its motion into a pair of orthogonal "vertical" and "horizontal" motion vectors which, in turn, cause a corresponding relative movement of the CRT cursor. The "new" location of the cursor is entirely a function of its "old" position and the relative movement of the mouse. Mice of this type are generally utilized by repeatedly "stroking" the mouse across the surface to move the cursor in the direction of the strokes.

Relative position mice cannot resolve absolute position on a surface and, therefore, repositioning such a mouse by removing it from, and replacing it on, the surface results in no change in the location of the controlled CRT cursor. For this reason, it is quite difficult to conveniently and reliably digitize or trace the features of an existing object, for example, a map.

Relative position mice commonly utilize small wheels or "trackballs" or similar friction devices, the frictional rotation of which on a surface tracks the motion of the mouse. In this manner, relative motion may be detected on any desk, table, or other surface. The surface does not have to be specially treated or encoded and, consequently, mice of this construction have great flexibility by reason of this virtually limitless surface compatability. And, as previously indicated, relative position mice are generally less expensive as such devices are ordinarily sold without the working surface. Alternatively, an optical/electronic mouse may be employed. In the optical mouse the mechanical trackballs are replaced by photoelectric sensors which detect relative movement over a specially patterned surface.

The mouse of the present invention relates to the second, or absolute position, category of mouse controllers. Such mice offer the substantial advantage of being able to ascertain the position of the mouse on a given surface, not merely in the relative sense, but in the absolute sense of being able to resolve the actual surface coordinates thereof. Consequently, such a mouse may be placed on a surface and its absolute position determined without an a priori knowledge of where the mouse has been.

Although absolute position mice have been known to the art for many years, such mice function only in combination with expensive, specially fabricated table surfaces. One known absolute position mouse is based upon the Hall effect (electro-magnetic) wherein a sensing coil of a moveable wand or mouse is activated by a pair of wires defined within a rectilinear grid of wires embedded in a working surface or tablet. More specifically, a timed sequence of electrical pulses is coupled to the wire grid from which the absolute position of the mouse adjacent the grid may be determined by time comparing the detected pulses in relationship to the known sequence of grid wire pulses. It will be appreciated, however, that absolute position determination according to such a scheme requires a relatively expensive and specialized table surface rendering this approach unsuitable for most home computer and similar lower end applications.

The present invention, in contrast, utilizes a pair of solid-state photosensitive arrays, or similar, optical arrays in conjunction with a uniquely patterned, but inexpensively manufactured, surface to effect absolute position orientation. The surface is preferably transparent permitting it to be advantageously overlaid on a chart or other graphic and includes a rectilinear pattern of irregularly spaced lines reflective to infrared light. Alternatively, an irregular checkerboard (tiled) surface may be utilized where adjacent areas are defined by differing indicies of reflectivity. As the mouse is moved over the surface (the mouse may, alternatively, be held stationary and the surface moved in relation thereto), the photosensitive arrays thereof detect and output signals representative of the relative orientation between the arrays and the pattern of lines.

The irregular surface line pattern establishes an identity between mouse output signals and mouse position vectors whereby any particular output signal uniquely corresponds to a single mouse position vector on the surface. A microprocessor or similar computing device is preferably utilized to convert these output signals into meaningful mouse position data. This data may include the angular orientation of the mouse as well as its position with respect to the surface.

An object of the present invention, therefore, is a system to ascertain the absolute position between a surface and an associated pointing device. The surface shall be relatively inexpensive to manufacture, particularly as the surface area is increased. Another object is a surface which is electronically passive and may be manufactured by printing or screening and, further, the surface shall preferably be transparent and adaptable for positioning over a chart or other work piece.

DESCRIPTION OF THE PREFERRED EMBODIMENT

Figure 1:
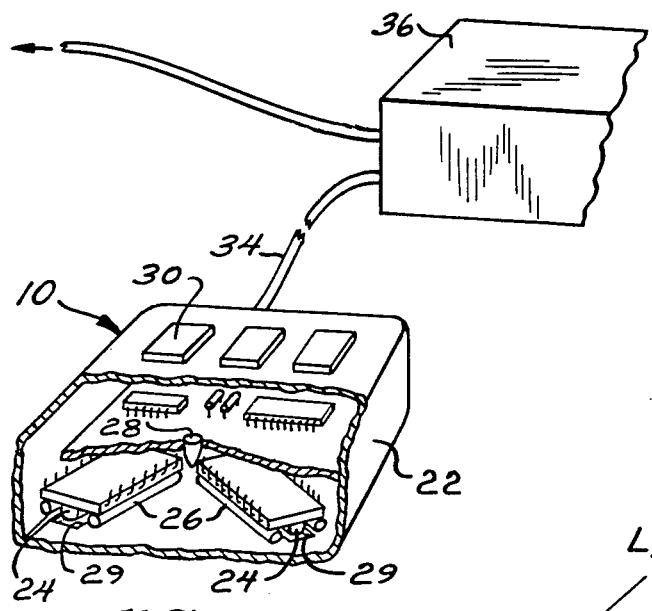
FIG. 1 is a perspective view of the mouse and tablet of the present invention with portions of the mouse broken away to reveal details thereof.

FIG. 1 illustrates one embodiment of the present invention wherein the absolute position of a pointing device or mouse 10 anywhere on a tablet 12 is resolved. Tablet 12 may be fabricated as large as necessary to meet the operational requirements of any particular application and, additionally, may be formed along a curved rather than planar contour. Considerations relating to the size of tablet 12 are discussed in detail below.

The tablet is preferably transparent permitting it to be overlaid onto a chart or other workpiece in an essentially inert manner, optically. In this way, the mouse is positioned by reference to the underlying surface with the tablet 12 serving, as discussed below, to determine the coordinate address of the mouse.

Figure 3:
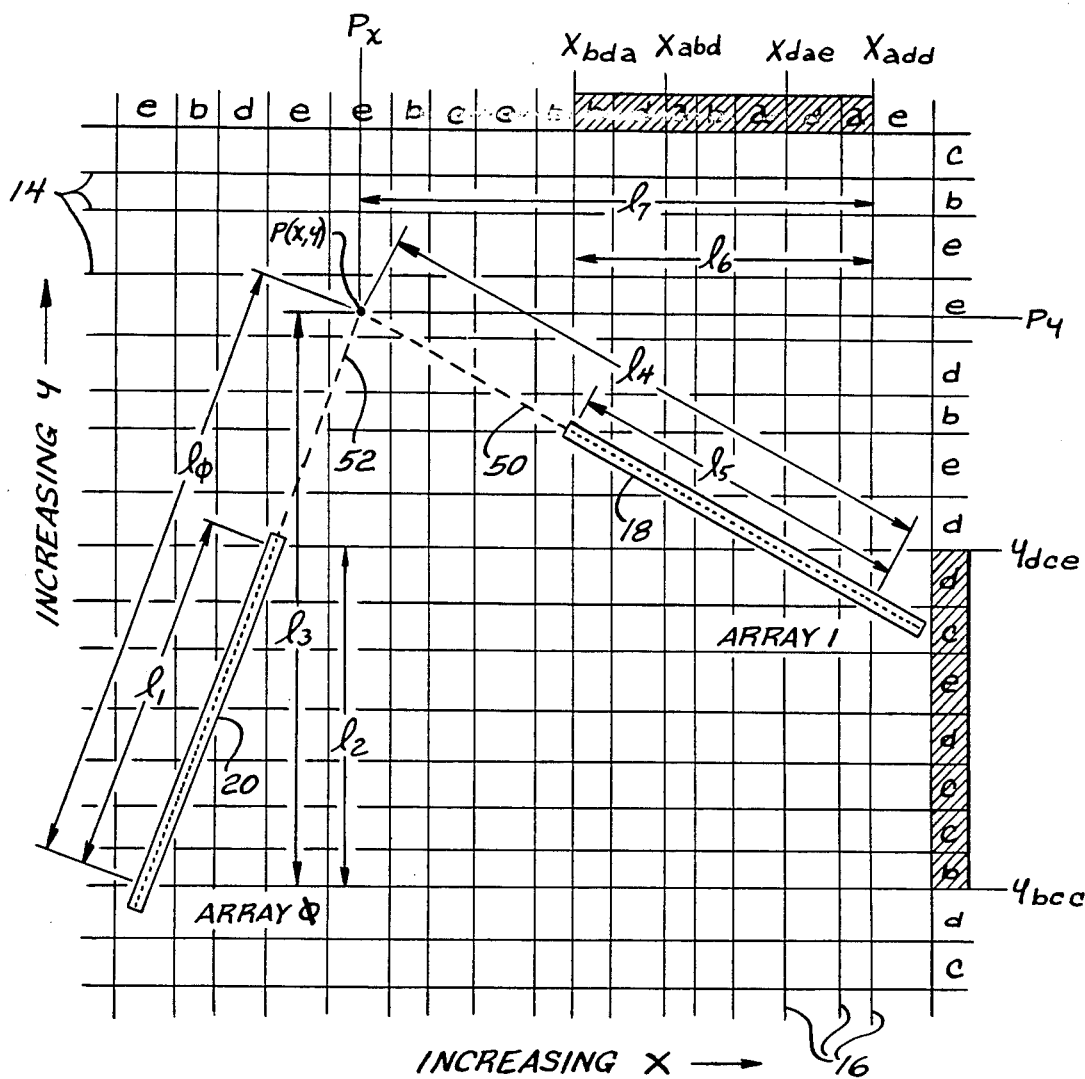
FIG. 3 illustrates placement of the mouse imaging arrays oriented in typical fashion on a fragmentary view of the tablet; and, FIG. 4 illustrates placement of the mouse imaging arrays for determining minimum array length.

The tablet illustrated in FIGS. 1 and 3 utilizes an irregularly spaced pattern of lines defining a rectilinear grid. These lines form two families 14 and 16 aligned, respectively, parallel to "x" and "y" axes. Although a rectilinear pattern of lines is shown; other coordinate axis systems, for example polar, may be utilized. In the preferred embodiment the lines are formed of a material reflective to infrared light and may be printed, screened, or otherwise affixed to, or within, the transparent medium defining tablet 12. Alternatively, the tablet may be defined by an irregular checker-board pattern of regions having distinct reflective indicies whereby the transition between adjacent regions generally corresponds to the lines 14 or 16 of the preferred embodiment.

It is advantageous from the standpoint of the numerical position calculation to distinguish between "x-lines" and "y-lines". Therefore, y-lines 14 and x-lines 16 are preferably formed of material having differing reflective or luminant responses thereby resulting in correspondingly distinctive video levels as measured by the light sensing arrays (discussed below) of mouse 10. Alternatively, different width lines may be utilized for each family of lines 14,16, again, creating distinct video levels to facilitate line family identification. Finally, separate x and y line patterns may be adopted whereby the family identity of each line comprising a detected sequence of lines can be uniquely ascertained. In such a case, x and y lines of the same width and reflectivity may be used. In the preferred embodiment described hereinafter, line families of differing reflective characteristics are utilized whereby family membership is readily determined without resort to unique x and y line spacing patterns.

Referring again to FIG. 1, mouse 10 includes a pair of linear imaging arrays 18 and 20 retained along the bottom surface of mouse housing 22. Satisfactory arrays commonly available include charge coupled devices (CCDs) of either a 1×1728 or a 1×2048 pixel format. The arrays are arranged in a V-configuration generally about a right angle. Light lenses 24 are positioned below the respective imaging arrays 18,20 and serve to focus light reflecting from the tablet onto the arrays. Alternatively, light collimators may be used to guide the light onto the arrays.

To assure uniform illumination of the tablet and consistent light reflection therefrom a pair of light bars 26 is placed in adjacent relationship along opposed longitudinal sides of each array 18,20. These light bars 26 may be of any conventional material suitable for light transmission, e.g. acrylics, and, further, bars 26 are preferably masked or coated to force the downward emission of the light energy therefrom. Light is initially coupled into an end of each light bar in conventional fashion from a light emitting diode 28. Diode 28 and imaging arrays 18,20 are of the infrared type, although diode/detector combinations operable in other spectral regions, including visible, are contemplated. Light communication openings 29 are provided in the housing below the imaging arrays and light bars through which the incident and reflected infrared light passes.

One or more function buttons 30 are provided on the mouse—the specific functions of which are defined by the host system and program for which the mouse is then being operated. A small electronic printed circuit board 32, fitted within housing 22 above the imaging arrays, may contain function switch multiplexing and/or latching circuitry as well as components for interfacing the imaging array 18,20 outputs. Mouse 10 is interconnected through cable 34 to a computation/communication system 36 which, in turn, feeds the host 'personal computer' or other controlled device.

Figure 2:
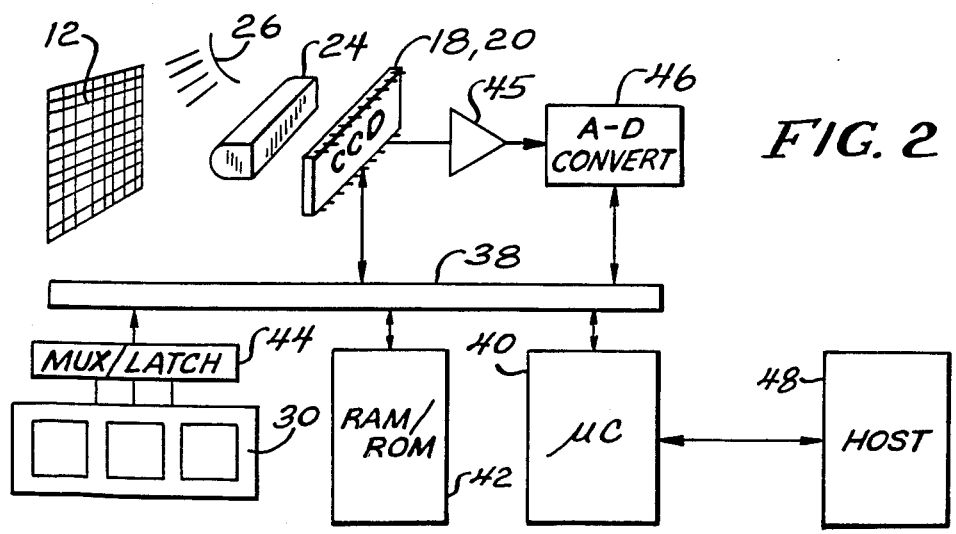
FIG. 2 is an electrical block representation of the mouse of FIG. 1.

Referring to FIG. 2, one of the imaging arrays 18,20 is shown, pictorially, spaced from light source 26, tablet 12, and lense 24. FIG. 2 also depicts the operational interconnection of each imaging array with the remainder of the microprocessor based absolute position mouse system. More specifically, imaging array 18,20 is shown interconnected via a common address/data bus 38 to microprocessor 40, system ROM/RAM 42, function switches 30 (through multiplexer/latches 44), and analog-to-digital (A/D) convertor 46. Processor 40 gates analog data from the imaging array, through amplifier 45, to A/D convertor 46. Amplifier 45 may additionally serve as a noise filter, if required. The array data corresponds to the light intensities impinging upon each of the photodetectors comprising the imaging array. As previously noted, a typical array length is 2048 pixels. The mouse operating program is retained in the conventional manner on system RAM/ROM 42. Processor 40 poles function switch latches 44 and reports switch closures as well as position coordinate to the host system 48.

The A/D convertor provides a digital output for each analog pixel. Processor 40, in turn, classifies these digital outputs from the A/D convertor into one of four expected levels corresponding to: (1) light reflected from an "x" tablet line; (2) light reflected from a "y" tablet line; (3) light reflected from the intersection of x and y tablet lines; and, (4) the background light level (i.e. the absence of light due to neglible reflection.). As noted above, tablet 42 may be formed of an irregular checkerboard pattern defined, in each axis, by alternating regions of transparent and partially reflective material. A similar four level classification results from such a modified tablet surface.

FIG. 3 illustrates the mouse, with its imaging arrays 18,20, oriented in a typical manner with respect to an enlarged section of tablet 12. As previously indicated, each imaging array is defined by a plurality of light sensing "pixels", typically 2048, arranged along common axes 50 and 52 for arrays 18 and 20, respectively. The arrays are arranged generally at right angles to one another, although the absolute position solution, described hereinafter, is applicable to any angle. As illustrated in FIG. 3, the arrays define an angle somewhat less than 90 degrees.

The position of the mouse on the tablet is defined by the location of a point "P" on the mouse which, in turn, is defined as the intersection of array axes 50 and 52. For purposes of discussion and processor 40 computation, tablet 12 is assumed to reside in the first quadrant of a conventional x,y coordinate system. Thus, tablet lines 14 and 16 are oriented along constant ordinate and abscissa values, respectively, numerically increasing upward and to the right. Point P is given the general coordinate P(x,y) where x and y define the particular location of the mouse on the tablet at any given instant.

Mouse position computation begins by processor 40 reading the digitized array pixels values from the A/D convertor into memory 42. As indicated, these values are then classified into one of four codes indicative of whether the pixel is "seeing" an x or y line, both lines, or no lines. From this digitized and classified data, processor 40 then computes the pixel center of each line, that is, the location or address along the respective arrays of each line crossing.

Depending upon mouse orientation, one or the other of the imaging arrays will be utilized to measure x-line crossings and, similarly, y-line crossings. Generally, the array subtending the greatest distance along a given axis will be used to ascertain the position of the mouse along such axis. Referring to FIG. 3, for example, array 18 spans, in the x-direction, lines $x_{bda}$ and $x_{add}$, a distance covering seven included spaces, while array 20 crosses only three lines 16 (including only two spaces). Therefore, array 18 would be selected, as described in more detail below, to establish the location of the mouse along x-axis. The length $L_5$ represents the distance along array 18 between lines $x_{bda}$ and $x_{add}$, the furthest spaced x-lines crossed by this array in its illustrated position. In a similar manner, array 20 spans, in the y-direction, lines $y_{bcc}$ and $y_{dce}$, a distance of 7 included spaces, while array 18 crosses just four lines, defining three included spaces. Consequently, array 20 provides the most reliable determination of mouse location along the y-axis. The length $L_1$ represents the distance along array 20 between lines $y_{bcc}$ and $y_{dce}$, the furthest spaced y-lines crossed by array 20 as shown.

Each family of lines 14,16 in tablet 12 forms an irregular sequence of line spacings which serves to uniquely locate the mouse thereon. These line spacings are selected from a small set of known exact distances. Five spacings, denominated a through e, are utilized in the embodiment described herein and shown in FIG. 3. Patterns may be formed with fewer or more predetermined line spacings with larger tablet sizes being generally achievable where more spacings are available. The pattern or sequence of line spacings is chosen such that any grouping of three adjacent spacings, known as a "cell", uniquely locates the cell along the respective axis of the tablet. Again, while the cells of the embodiment described herein are comprised of three adjacent spacings, i.e. a "3-cell", cells of differing number of spaces may be selected. The generation of a proper line spacing sequence is considered in more detail below.

Arrays 18,20 are of sufficient length that at least one of the arrays subtends a full cell (i.e. three spaces) in each of the x and y directions. As previously noted, this condition is easily met by the arrangement of FIG. 3 in which arrays 18 and 20 respectively bridge seven adjacent x and y spaces comprising five unique cells. For example, the seven spaces bounded by lines $x_{bda}$ and $x_{add}$ define cells bda,dab,abd,bdd, and dda. Thus, the general location of the mouse on tablet 12 may be determined by reference to any cell bounded thereby.

In view of the fact that the mouse may be placed on the tablet in any arbitrary orientation; arrays 18,20 do not, in the general case, cross tablet lines 14,16 at right angles and, therefore, the distance between any given adjacent line pair, as measured by an array, will be greater than the actual line pair spacing by a factor equal to the sine inverse of the angle between the array and lines. However, while the absolute measured spacings between adjacent lines change as a function of angular orientation of the mouse on the tablet, the ratio formed between any two such measured spacings does not change as a function of angle. Thus, each unique 3-cell defines a corresponding unique set of three ratios, for example, 3-cell bda includes the three ratios b/d, b/a, and d/a. For this reason measured distances are normalized by processor 40 as ratios of line spacings whereby these ratios may be compared, without regard to the angular orientation of the mouse, against the ratios for the set of all known cells stored in system memory 42. The set of line spacings, a through e, must be chosen such that every combination of two members of the set forms a unique ratio. One method for choosing such a set of distances is for every value to be relatively prime with respect to all other values.

Processor 40, after identifying the line types detected (i.e. whether an x or y-line) and the pixel centers of the lines, computes the measured line spaces and, importantly, the several ratios formed between measured line spaces. Next, processor 40 compares these computed ratios against a table of known ratios stored in memory 42 which uniquely characterize tablet 12. When a match is found, the location of the cell, and consequently the array, along the respective axis is known. It will be appreciated that once the identity of a given measured cell is known, the absolute coordinates of any tablet line through the associated array is easily computed by reference to the tablet topography permanently retained in memory 42. For example, once the cell abd underlying array 18 along the x-axis has been identified, the identity, and therefore address, of the first x-line, $x_{bda}$, intercepted by the array can be determined by substracting the distances b and d from the x-coordinate, $x_{abd}$, defining the left side of cell abd. The distances b and d, as well as their relative placement leftward of cell abd are, of course, known parameters which define tablet 12 and are stored in memory 42. Thus, the identities and coordinates of lines $x_{bda}$, $x_{add}$, $y_{dce}$, and $y_{bcc}$ are, in turn, calculated by processor 40.

The location of the mouse, i.e. point P(x,y), on the tablet is next calculated by processor 40 using well known similar triangle relationships as follows:

$$L_7/L_4 = L_6/L_5 \text{ for the x-coordinate;}$$

$$L_3/L_0 = L_2/L_1 \text{ for the y-coordinate.}$$

And, $$P_x = x_{add} - L_7$$
$$= x_{add} - L_4(L_6/L_5)$$
$$P_y = y_{bcc} + L_3$$
$$= y_{bcc} + L_0(L_2/L_1)$$

The sign of $L_7$ and $L_3$, that is, whether each term is added to or subtracted from the respective base x or y value is determined by which end of the array crosses the minimum of the included x or y span. If the far end of the array (away from point P) crosses the minimum, distance term will be added to the base value to derive the appropriate coordinate, otherwise, it will be subtracted.

As previously indicated, arrays 18,20 must be of sufficient length to assure inclusion of at least three spaces, i.e. one 3-cell. In order to cover three adjacent spaces from any position or orientation on the tablet, the arrays must, in fact, be almost four spaces in length. Moreover, the arrays must span a complete 3-cell from a variety of non-perpendicular angles which further increases the length requirement of the arrays.

Figure 4:
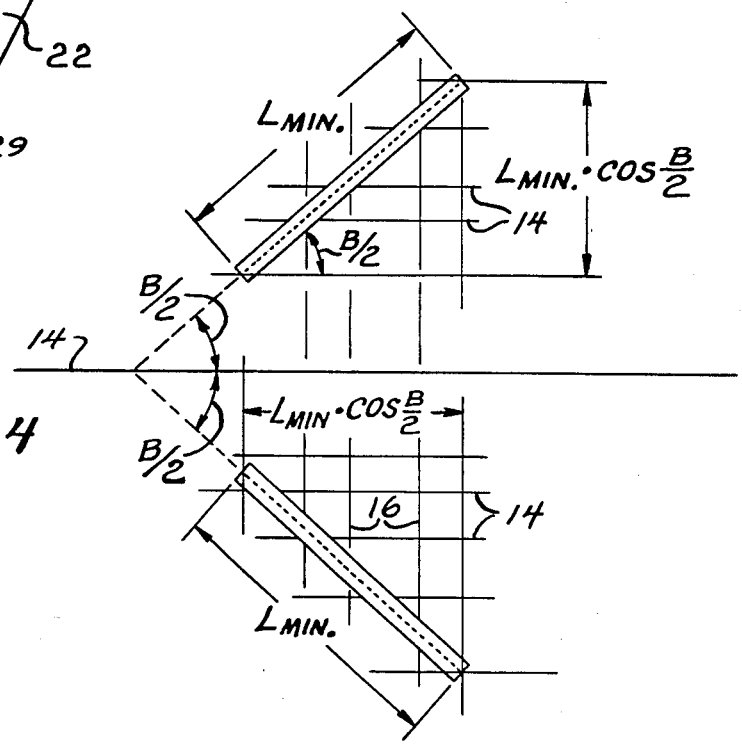

The required minimum array length, designated $L_{min}$, can be approximated in terms of the maximum spacing between any two grid lines, designated $S_{max}$. A lower bound on $L_{min}$ is reached at the point where either the x or y-lines bisect the angle between the two arrays, angle B, as illustrated in FIG. 4. The following approximation conservatively assures that each array will span at least one 3-cell:

$$L_{min} \cdot \sin(B/2) = 4 \cdot S_{max}$$

$$L_{min} \cdot \cos(B/2) = 4 \cdot S_{max}.$$

Available commercial imaging arrays often limit $L_{min}$ to a maximum size and, consequently, the above equations are generally solved for $S_{max}$ where $L_{min}$ is known. For example, the pitch or spacing of pixels on a typical 1×2048 imaging array is approximately 13 um which yields a maximum value for $L_{min}$ of 2048×13 um or 26.6 mm. Assuming placement of the arrays at a right angle, i.e. B=90 degrees, $S_{max}$ is about 4.7 mm, or slightly more than sixth the length, $L_{min}$, of the array.

As previously indicated, the rectilinear pattern of lines 14,16 formed on, or within, the tablet defines five spaces of predetermined width, a through e, the ratio of any two of which uniquely identifies the constituent members comprising the ratio. It was further indicated that any three adjacent spaces formed along either axis define a cell having a unique identity not repeated along that axis. It must again be emphasized that the size of the set of valid spacing as well as the number of adjacent spaces defining a cell may be altered according to the dimensional requirements of the tablet. A 9×9 inch tablet size may be fabricated from a set of five spacings and the 3-cell geometry described herein.

Each 3-cell formed along a given tablet axis must be unique whether read from the right or from the left so that the direction of the imaging array may be determined; that is, valid cells must not be self-reflective. Thus, cells abc and aab are valid while cells aaa and aba are not. The latter cells being identical and indistinguishable whether read from right to left while the former define unique combinations when read in both directions. Since the right and left orderings of any given cell form a reflection pair, e.g. abc-cba, once a cell has been defined, its reflective counterpart cannot also be used elsewhere in the pattern. In this regard, it should be observed that where the x and y-line families are independently identifiable, as discussed above, cell codes and patterns defined along one axis may be repeated along the other.

The number of possible cells which can be formed and, therefore, the overall size of the resulting tablet can be determined using well known combinatorial principles once the size of the cells and number of members comprising the set of spaces are defined. For the 5spacing, 3-cell arrangement disclosed herein, there are fifty valid 3-cells as listed in Table 1.

TABLE 1

| Valid 3-Cells (with reflection pairs) for a set of 5 Spacings | | | | |
|---|---|---|---|---|
| abc-cba | abe-eba | ace-eca | bcd-dcb | bde-edb |
| acb-bca | aeb-bea | aec-cea | bdc-cdb | bed-deb |

TABLE 1-continued

| Valid 3-Cells (with reflection pairs) for a set of 5 Spacings | | | | |
|---|---|---|---|---|
| bac-cab | bae-eab | cae-eac | cbd-dbc | dbe-ebd |
| abd-dba | acd-dca | ade-eda | bce-ecb | cde-edc |
| adb-bda | adc-cda | aed-dea | bec-ceb | ced-dec |
| bad-dab | cad-dac | dae-ead | cbe-ebc | dce-ecd |
| baa-aab | abb-bba | acc-cca | add-dda | aee-eea |
| caa-aac | cbb-bbc | bcc-ccb | bdd-ddb | bee-eeb |
| daa-aad | dbb-bbd | dcc-ccd | ccd-ddc | cee-eec |
| eaa-aae | ebb-bbe | ecc-cce | edd-dde | dee-eed |

A sequence or pattern containing one occurrence, only, of each of fifty cells may be constructed as follows. First, the possible combinations of the 5 spacings, taken three at a time are listed (see Table 2):

TABLE 2

| Combinations $\binom{5}{3}$ | | | |
|---|---|---|---|
| abc | abd | abe | acd |
| ace | ade | bcd | bce |
| bde | cde | | |

Next, each of these combinations is converted into a five spacing sequence containing only the three members of the space set orginally defining the combination and, more specifically, the first two elements of each combination are added to the end of that combination to create the specified 5-sequence. For example, the first two elements, ab, of combination abc are added to the combination to form the 5-sequence abcab, the following ten 5-sequences are formed:

TABLE 3

| 5-Sequences formed from 3-Combinations | | | | |
|---|---|---|---|---|
| abcab | acdac | adead | aebae | bcdbc |
| bdabd | becbe | cdecd | ceace | cdbcd |

Finally, these ten 5-sequences are concatenated such that the resulting union of any two adjacent 5-sequences produces, in addition to the six valid 3-cells comprising the two individual 5-sequences forming the concatenation, two additional valid 3-cell sequences of the form xyy and yyz, where x,y, and z are elements of the spacing set (a,b,c,d,e). For example, 5-sequences abcab and bcdbc may be concatenated to produce the sequence abcabbcdbc which includes 3-cells abb and bbc in addition to the 3-cells abc, bca, and cab from the first 5-sequence and the 3-cells bcd, cdb, and dbc from the second 5-sequence. In similar manner the remaining 5-sequences concatenated to generate the following fifty spacing sequence:

abcab/bcdbc/cdecd/debde/ebceb/bdabd/daeda/acdac/ceace/eabea/(ab)

The slash marks indicating the point of concatenation. This fifty spacing sequence uniquely incorporates all fifty 3-cells available where five discrete spacing (a,b,c,d,e) are defined. (3-cells eaa and aab either by "wrapping" the sequence around to form a continuous loop or by adding the elements ab to the end of the string as indicated, above, by parenthesis.)

What is claimed:
1. A two-dimensional position location system including a marking means, the marking means being defined over a two-dimensional surface and including a pattern, the pattern comprising an irregular sequence of contiguous spacings, each spacing having a dimension selected from a predetermined set of non-equal dimensions, a cell being defined as a group of a predetermined number of adjacent spacings, the sequence of spacings being arranged whereby any cell within the sequence uniquely locates an associated region of the marking means; pointing means adapted for relative movement adjacent the two-dimensional surface of the marking means, the pointing means including means for identifying marking means cells and means for computing the position of the pointing means on the marking means surface.

2. A two-dimensional position location system including a marking means, the marking means being defined over a two-dimensional surface and including a two-dimensional pattern, the pattern comprising independent sequences of continuous irregular spacings in each dimension, each spacing having a dimension selected from a predetermined set of non-equal dimensions, a cell being defined as a group of a predetermined number of adjacent spacings, the sequence of spacings being arranged whereby any cell within the sequence uniquely defines a position along one of the marking means pattern dimensions; pointing means adapted for relative movement adjacent the two-dimensional surface of the marking means, the pointing means including means for identifying marking means cells and means for computing the position of the pointing means on the marking means surface.

3. The two-dimensional position location system of claim 2 wherein the boundary between each pair of contiguous spacing of the pattern is defined by a change in the reflectivity of the marking means at said boundary.

4. The two-dimensional position location system of claim 3 wherein the means for identifying the marking means cells includes means for illuminating a region of the marking means adjacent the pointing means with at least one wavelength of electromagnetic energy and means for detecting the illuminating means energy reflected by the marking means.

5. The two-dimensional position location system of claim 4 wherein the boundaries of the contiguous spacings in the first pattern dimension are defined by a first illumination reflectivity and the boundaries of the contiguous spacings in the second pattern dimension are defined by a second illumination reflectivity.

6. The two-dimensional position location system of claim 4 wherein the boundaries of the contiguous spacings in the first pattern dimension include means reflective of a first energy wavelength and the boundaries of the contiguous spacings in the second pattern dimension include means reflective of a second energy wavelength and wherein the means for illuminating a region of the marking means includes means for generating electromagnetic energy radiation at said first and second wavelengths and the means for detecting the illuminating means energy includes separate means for detecting each of said first and second wavelengths illuminating means energy.

7. The two-dimensional position location system of claim 1 wherein the means for identifying markings means cells includes means defined along at least an axis of the pointing means for measuring the individual dimensions, of a predetermined minimum number of contiguous spacings, along said pointing means axis and means for calculating the dimension ratios of selected pairs of spacing, said ratios being independent of the angular orientation of said pointing means axis on the marking means whereby the identity of the marking means cell is determined from the set of calculated segment dimension ratios.

8. The two-dimensional position location system of claim 1 wherein the means for identifying marking means cells includes means defined along at least an axis of the pointing means for measuring the individual dimensions, of a predetermined minimum number of contiguous spacings, along said pointing means axis and means for calculating the dimension ratios of selected pairs of spacing, said ratios being independent of the angular orientation of said pointing means axis on the marking means whereby the marking means cell is identified from the set of measured spacings and from the set of individual calculated segment dimension ratios.

9. The two-dimensional position location system of claim 7 wherein the means for identifying marking means cells includes memory means for storing known spacing ratios corresponding to the marking means pattern and means for comparing said calculated ratios against the ratios stored in the memory means whereby the identity of a marking means cell is determined.

10. The two-dimensional position location system of claim 8 wherein the means for identifying marking means cells includes memory means for storing known spacings and known spacing ratios corresponding to the marking means pattern and means for comparing said measured spacing dimensions and said calculated spacing ratios against the known spacings and spacing ratios whereby the identity of a marking means cell is determined.

* * * * *